United States Patent [19]
Ladouceur

[11] Patent Number: 5,595,422
[45] Date of Patent: Jan. 21, 1997

[54] WHEEL COVER ASSEMBLY HAVING ANTI-THEFT RETAINER SYSTEM

[75] Inventor: Lawrence C. Ladouceur, Windsor, Canada

[73] Assignee: Textron Automotive Company, Inc., Troy, Mich.

[21] Appl. No.: 638,764

[22] Filed: Apr. 29, 1996

[51] Int. Cl.⁶ ....................................... B60B 7/16
[52] U.S. Cl. ..................... 301/37.21; 301/37.37
[58] Field of Search ........................ 301/37.1, 37.21, 301/37.37, 37.31, 108.1, 108.4

[56] References Cited

U.S. PATENT DOCUMENTS

| | | | |
|---|---|---|---|
| 2,874,561 | 2/1959 | Alger | 301/37.21 X |
| 4,842,339 | 6/1989 | Roulinson | 301/37.37 |
| 4,998,780 | 3/1991 | Eshler et al. | 301/37.37 |
| 5,163,739 | 11/1992 | Stanlake | 302/37.37 |

FOREIGN PATENT DOCUMENTS

| | | | |
|---|---|---|---|
| 497640 | 8/1992 | European Pat. Off. | 301/108.1 |
| 2542671 | 9/1984 | France | 301/37.21 |

*Primary Examiner*—Russell D. Stormer
*Attorney, Agent, or Firm*—Reising, Ethington, Barnard & Perry

[57] ABSTRACT

A wheel cover assembly for covering the wheel of an automotive vehicle has a main body portion formed with a plurality of circumferentially spaced wells having integral cap portions to receive and conceal the lug nuts of the wheel. Locking arms project axially from the wells and embrace the lug nuts to lock the cover member securely on the wheel. Expansion slots are provided between the locking arms of each well to facilitate the disengagement of the locking arms from the lug nuts. A special anti-theft release tool is insertable into the expansion slots forcing the locking arms radially outwardly of one another sufficiently to release the lug nuts and permit the wheel cover to be removed from the wheel.

16 Claims, 5 Drawing Sheets

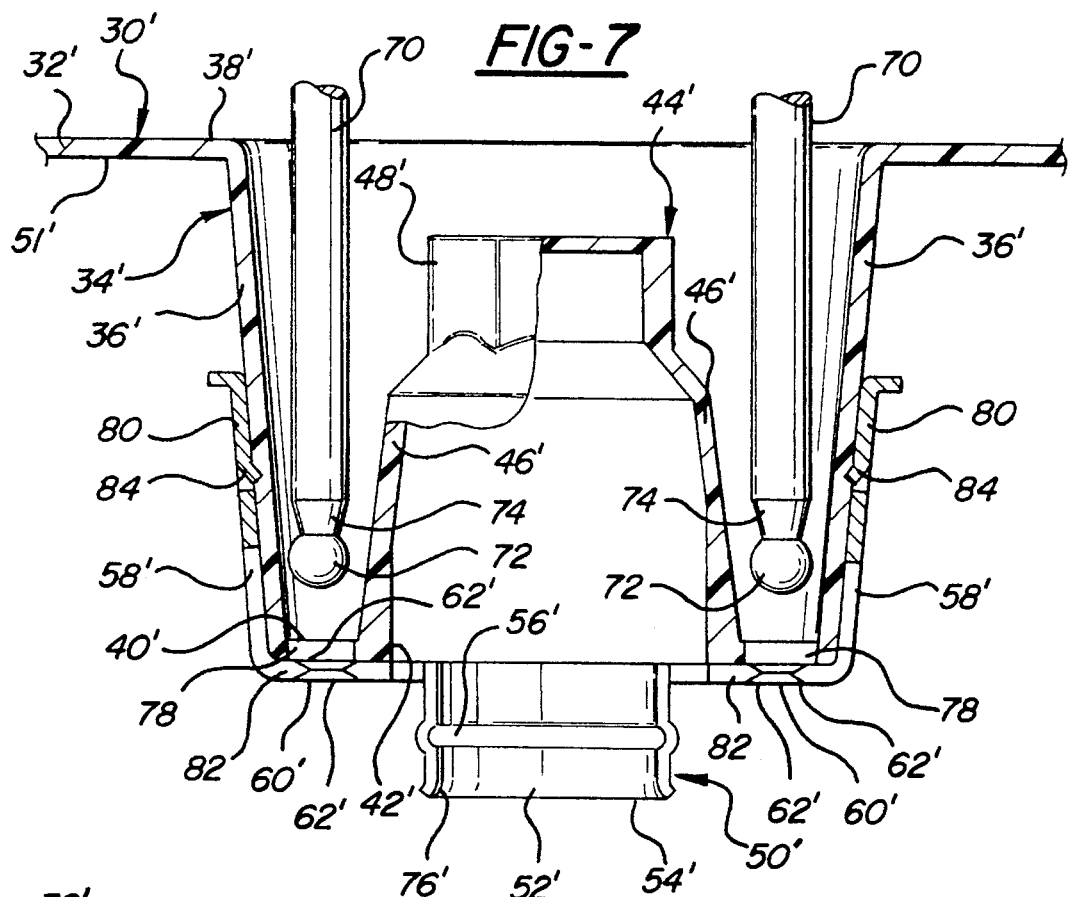
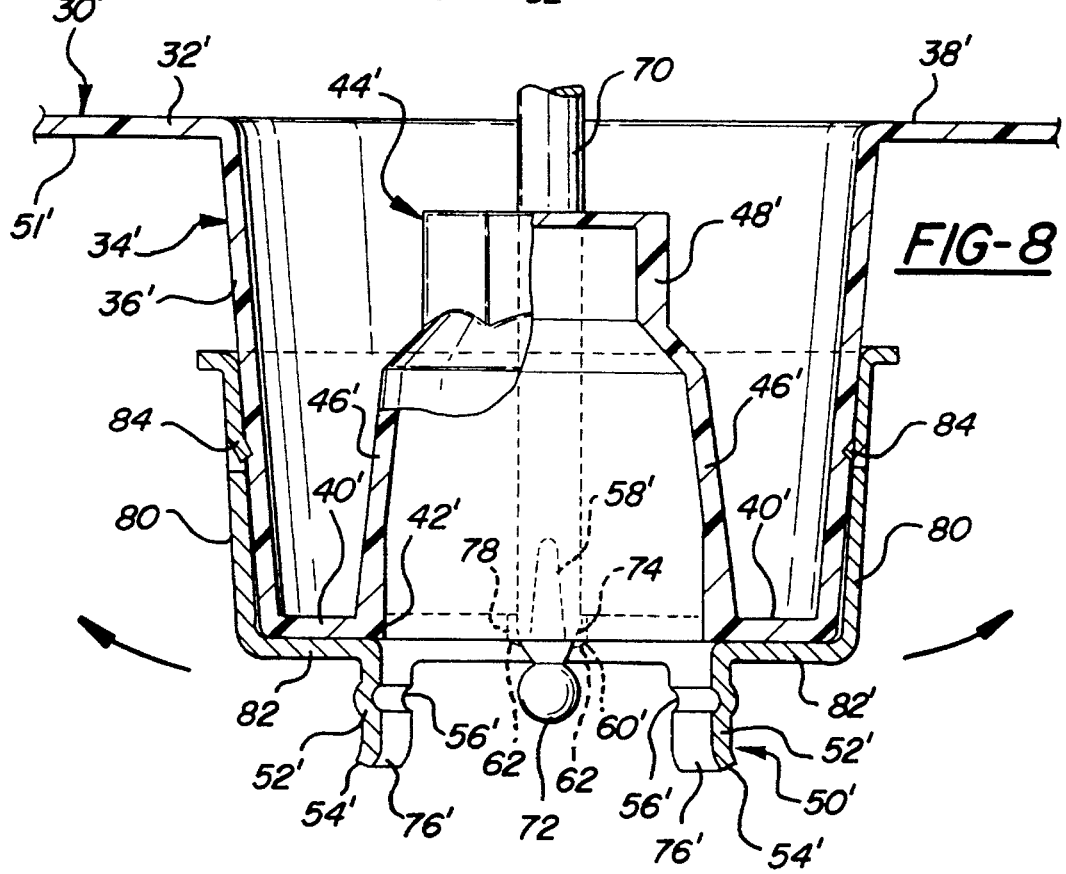

ns,595,422

WHEEL COVER ASSEMBLY HAVING ANTI-THEFT RETAINER SYSTEM

TECHNICAL FIELD

This invention relates to center mount wheel covers for covering the wheels of an automotive vehicle and particularly to wheel covers which mount on the wheel by engagement with the lug nuts on the wheel.

BACKGROUND OF THE INVENTION

Various wheel cover retention systems are known for retaining a wheel cover to the wheel of the vehicle. Center-mount type retention systems carried by the wheel cover are engageable with the lug nuts of the wheel as a means to secure the cover to the wheel.

U.S. Pat. No. 4,998,780 discloses a conventional center-mount system in which a plurality of decorative mounting cap members are loosely captured on the wheel cover such that they may be threaded onto special externally threaded lug nuts of the wheel. The cap members are separately formed and of fairly complex shape adding cost and complexity to the manufacture of the wheel cover assembly. Such cap members are prone to loosening over time and may rattle during operation of the vehicle. Further, the cap members do not prevent unauthorized removal of the wheel covers. All that is required to remove the wheel cover is the unthreading of the cap members. Apart from the wheel cover itself, the externally threaded lug nuts are more costly to manufacture than conventional lug nuts.

U.S. Pat. Nos. 4,842,339 and 5,163,739 disclose center-mount retention systems which lock the wheel cover securely into engagement with the lug nuts of a vehicle wheel. Thus, in order to steal a wheel cover, the lug nuts must be removed; while such lug nut removal is an inconvenience, it does not constitute an anti-theft safeguard. Moreover, the cover members of the aforementioned '339 and '739 patents have no cap portions and as such the lug nuts of the wheels project into open wells of the cover members and are visible from outside the wheel covers, detracting from the aesthetic quality of the wheel covers.

A wheel cover assembly formed in accordance with the present invention overcomes the foregoing objections by providing an anti-theft configuration that provides for wheel cover removal only by use of an anti-theft system including a wheel cover release tool.

SUMMARY OF THE INVENTION AND ADVANTAGES

A center-mount wheel cover assembly constructed in accordance with the invention comprises a cover member formed with a plurality of circumferentially spaced wells extending axially inwardly from an outer side of the cover member and having central openings for receiving associated lug nuts of a vehicle wheel and including unitary cap portions covering the central openings to conceal the lug nuts there beneath. An anti-theft retainer system is provided on the inner side of the cover member and includes resilient lug nut-embracing locking arms that extend axially from at least some of the wells and expandable radially outwardly to receive an associated lug nut the wheel between the locking arms and biased radially inwardly to close at least partially around and embrace the lug nut to lock the cover member on the wheel. The retaining system further includes arm-expanding reaction surfaces provided between the locking arms which are accessible through the cover member for engagement by a force-applying release tool inserted between the reaction surfaces forcing them apart and consequently expanding the locking arms radially outwardly to permit removal of the cover member from the wheel.

The anti-theft retainer system locks the wheel cover securely on the wheel to prevent loosening or unauthorized removal of the wheel cover. However, unlike the prior art anti-theft center-mount retaining systems discussed above, the wheel cover of the present invention is dismounted from the wheel only by use of an anti-theft release tool that is operative to release a wheel cover without removing the lug nuts. The reaction surfaces of the present invention are engageable by the special force-applying anti-theft release tool acting to expand the locking arms out of engagement with the lug nuts and permit authorized removal of the wheel cover from the wheel only by use of the anti-theft release tool.

The unitary cap portions of the wheel cover overlie the central opening of the wells and hence conceal the lug nuts from view.

The unitary construction of the cap portions is less costly to manufacture than center mount wheel cover retention system with separate mounting caps. Further, such unitary cap portions cannot loosen and rattle like the separate mounting caps shown in U.S. Pat. No. 4,998,780.

THE DRAWINGS

These and other features and advantages of the invention will become more readily understood and appreciated by those skilled in the art when considered in connection with the following detailed description and accompanying drawings, wherein:

FIG. 7 is a cross-sectional view similar to that of FIG. 4 but of an alternative embodiment of the invention; and FIGS. 8 and 9 are cross-sectional views similar to FIGS. 5 and 6, but of the alternative embodiment.

DETAILED DESCRIPTION

Figure 1:
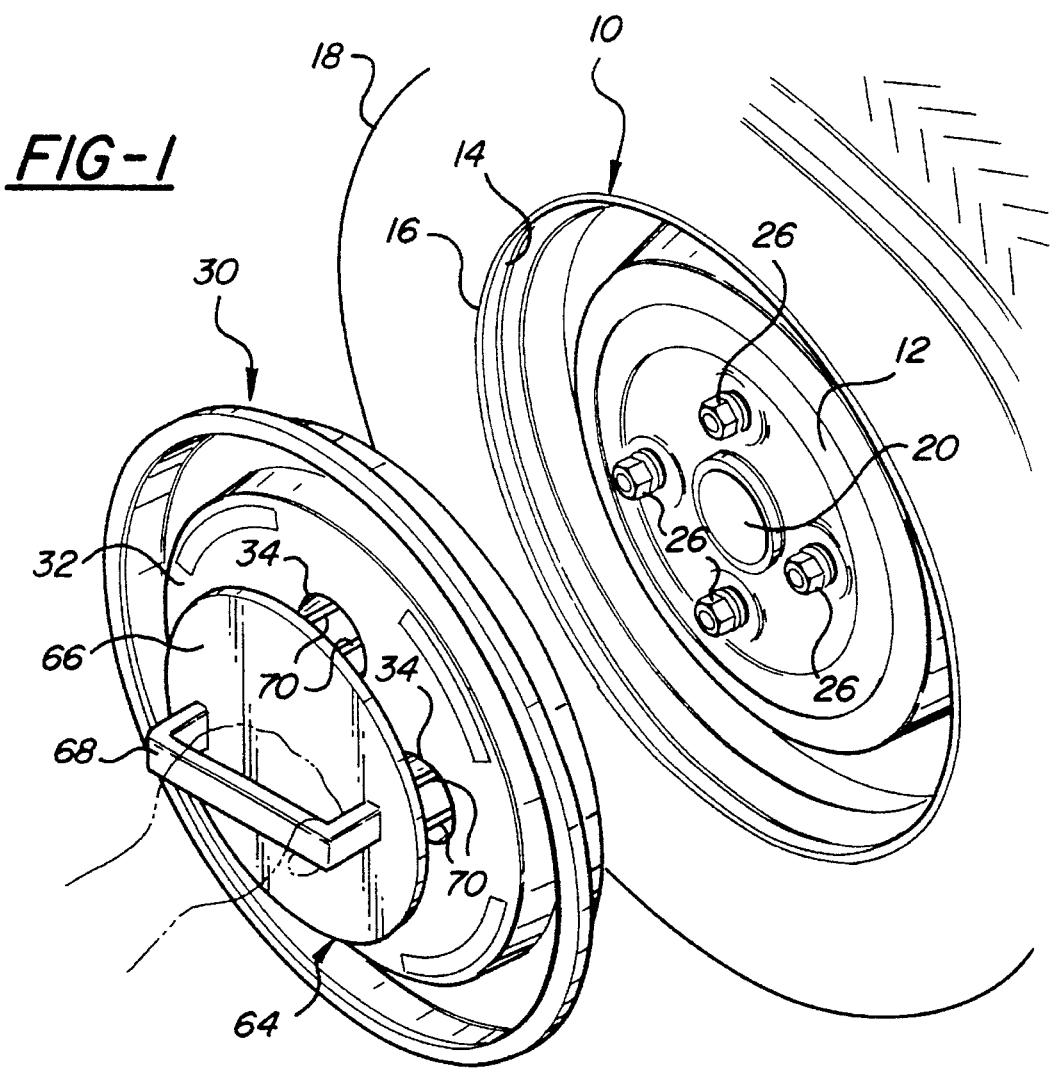
FIG. 1 is a diagrammatic perspective view of a wheel cover assembly of the invention shown in relation to a vehicle wheel on which it is to be mounted.
Figure 5:
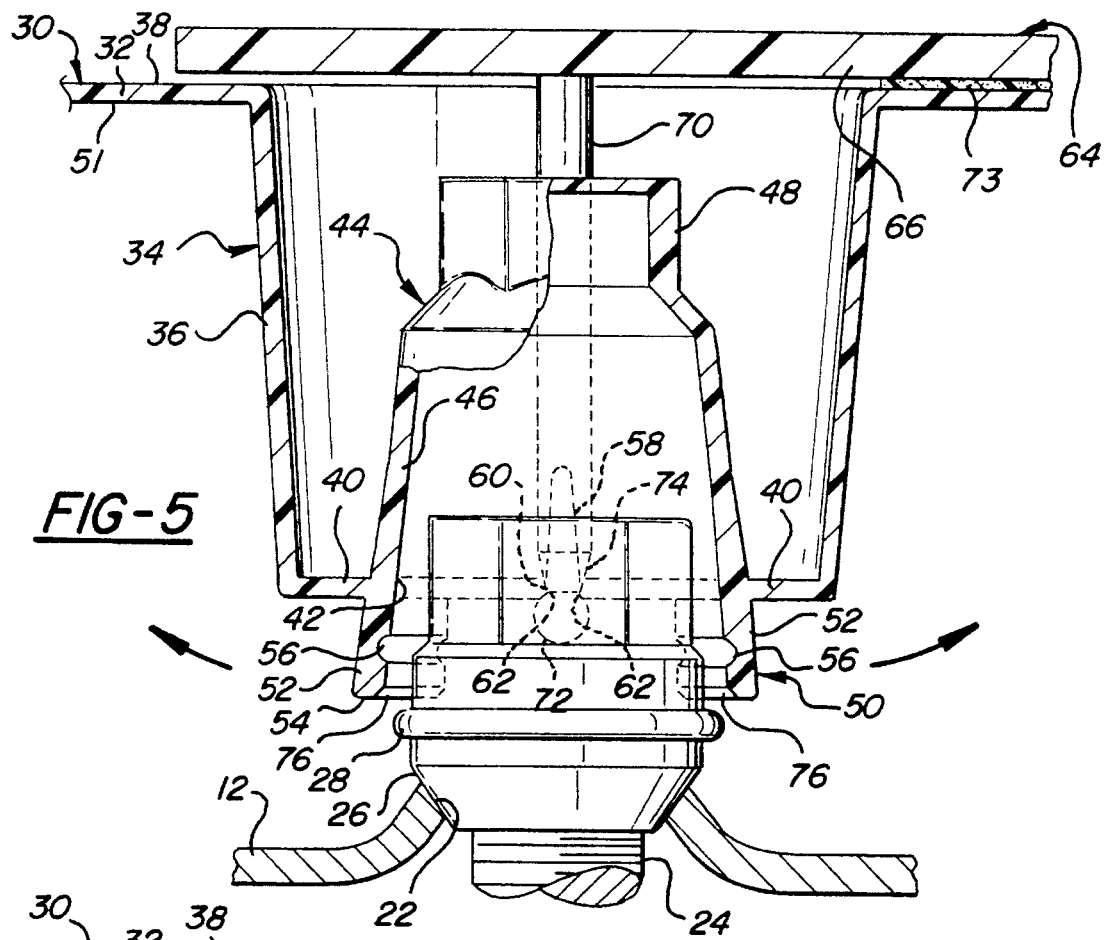
FIG. 5 is a cross-sectional view taken generally along lines 5—5 of FIG. 3 showing the tool extended into the expansion slots causing outward radial deflecting of the locking arms.

A conventional wheel of an automotive vehicle is designated generally at 10 in FIG. 1 and includes a center disc portion 12 and an outer rim portion 14 formed with a tire bead flange 16 for mounting a tire 18 on the wheel 10. The disc portion 12 of the wheel is formed with a central hub-receiving opening 20 receive a corresponding hub of the vehicle (not shown) and a plurality of circumferentially spaced wheel stud-receiving openings 22 (one of which is shown in FIG. 5) arranged about the central opening 20 to receive correspondingly arranged lug studs 24 of the vehicle, and on which lug nuts 26 are threaded tightly against the wheel to secure the wheel 10 to the axle hub of the vehicle, in conventional manner. At least some and preferably all of the lug nuts 26 are formed with an annular locking rib 28 for purposes to be described below.

A wheel cover assembly 30 constructed in accordance with the invention is illustrated in FIG. 1 for covering the disc portion 12 of the wheel 10. The assembly 30 includes a disk-like cover member or body portion 32 molded of plastics material or pressed or otherwise formed from metal or metal/plastic material having a plurality of circumferentially spaced wells 34 which register with the lug nuts 26 of the wheel. Referring to FIGS. 3–6, the wells 34 each have a tubular outer side wall 36 that projects axially inwardly from an outer surface 38 of the body portion 32 of the cover member 32 a predetermined distance to an annular bottom wall 40 of the well. Each bottom wall 40 has a central opening 42 that is alignable with the associated lug stud openings 22 of the wheel, such that when the cover member 32 is placed against the wheel 10, each of the lug nuts 26 extends through a respective one of the openings 42 into the wells 34. Each well has a unitary decorative cap portion 44 that covers the opening 42 to conceal the lug nut within the well 34. The cap portions 44 are formed as one piece with the wells 34 and hence are immovable with respect to the cover member 32. A side wall 46 of each cap portion 44 surrounds the opening 42 of the well it is associated with and extends axially outwardly from the bottom wall 40 thereof to a decorative hexagonal-shaped closed end 48. The hexagonal shape is illustrative only with it being understood other geometric shapes are equally suitable or, if desired, the closed end can be omitted, in which case the lug nuts are the decorative visible feature. The side walls 46 are spaced radially inwardly of the surrounding side walls 36 of the wells to provide clearance therebetween.

Figure 4:
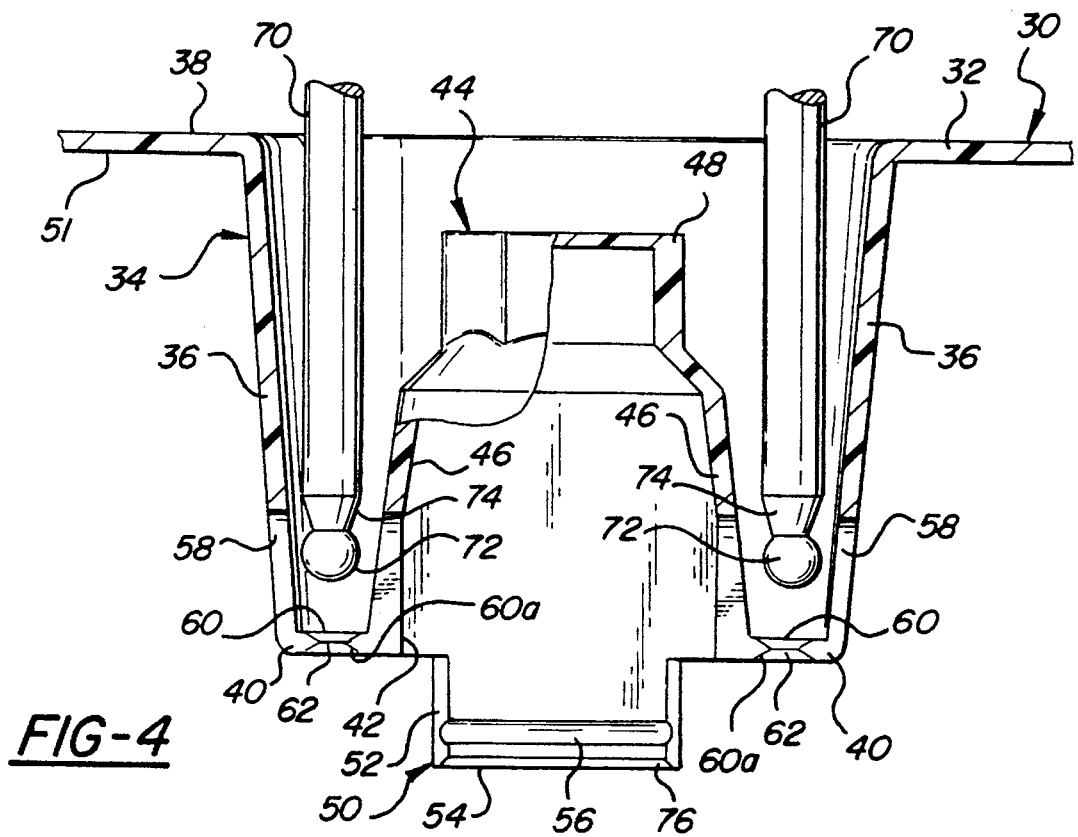
FIG. 4 is a cross-sectional view taken generally along lines 4—4 of FIG. 3 showing force-applying members of the tool extended into the well.
Figure 6:
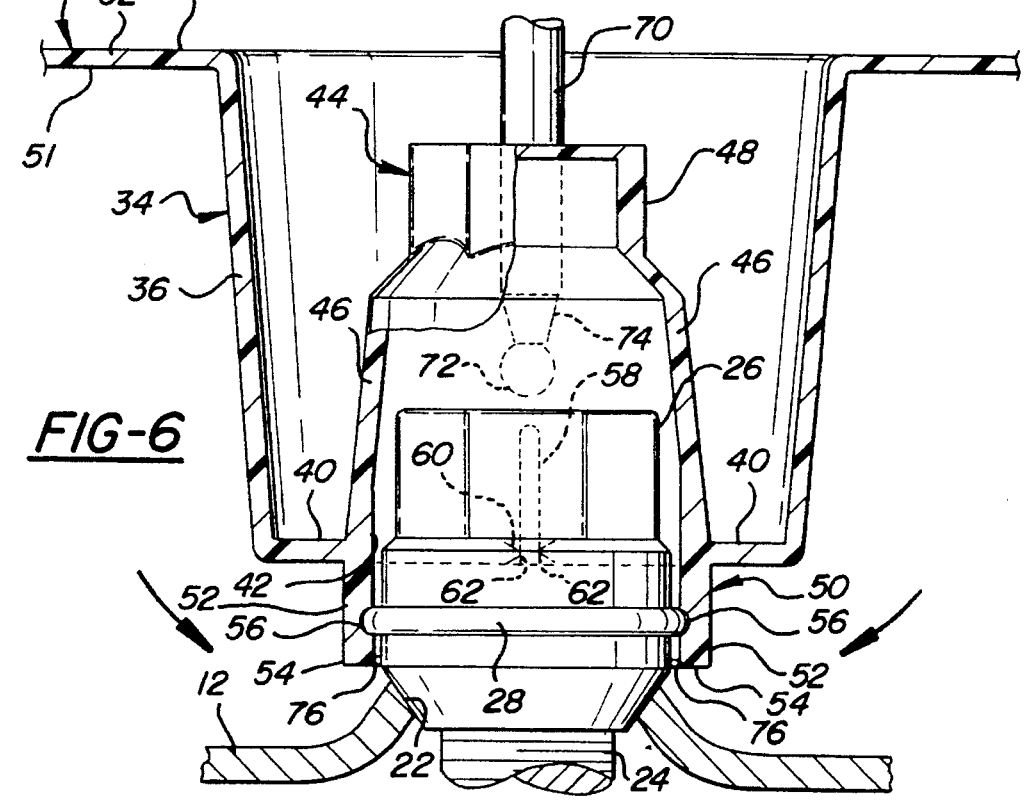
FIG. 6 is a view like FIG. 5 but showing the tool withdrawn from the expansion slots and the arms biased into locking engagement with a lug nut of the wheel.

An anti-theft retainer system 50 is provided on the inward surface 51 of the cover member 32 and comprises resilient lug nut-embracing locking arms 52 that extend axially from at least one and preferably each of the wells 34 to free ends 54 thereof. As illustrated in FIGS. 4–6, the locking arms 52 of the first embodiment of the invention are formed as an integral, unitary part of the wells 34 and may comprise axially inward extensions of the side wall 46 of the cap portions 44 that project beyond the bottom wall 40 of the wells 34. As illustrated also in FIGS. 5 and 6, each well 34 preferably includes a pair of such locking arms 52 disposed on opposite sides of the well in diametrically opposed relation to one another. The locking arms 52 are provided at their free ends with a locking shoulder in the preferred form of an arcuate groove 56 engageable with the locking rib 28 of the respective lug nuts 26.

Figure 3:
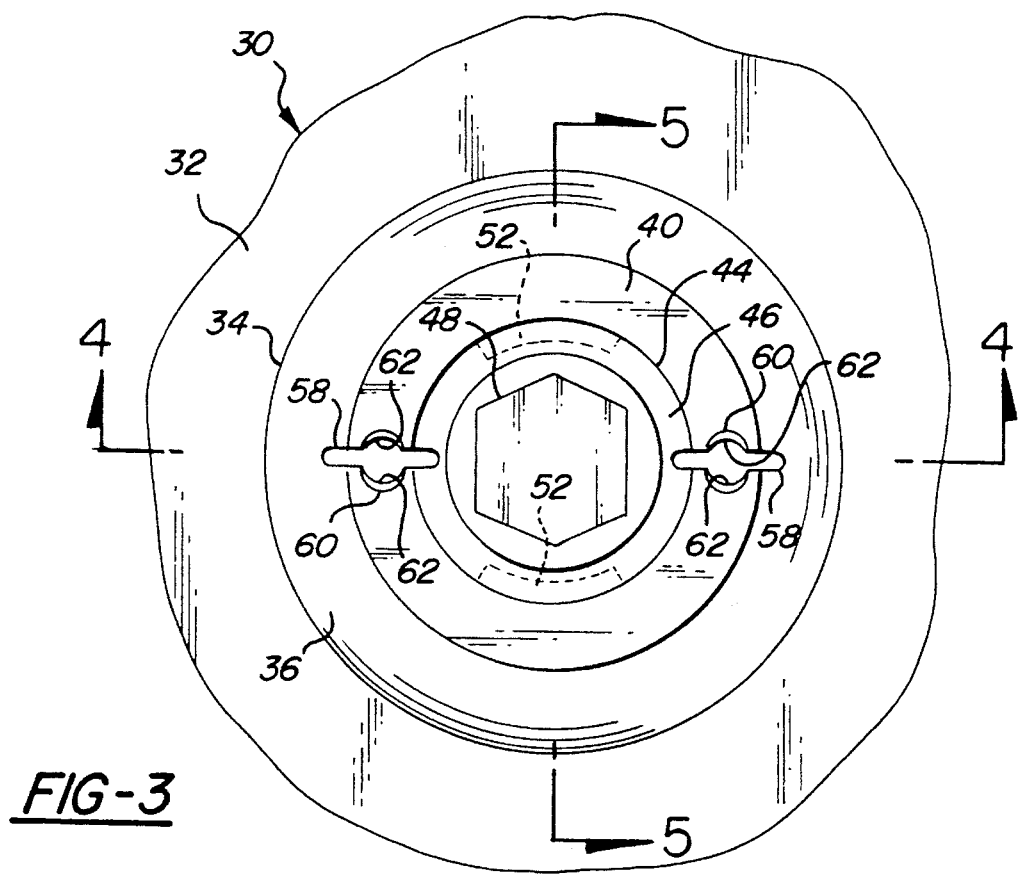
FIG. 3 is an enlarged fragmentary plan view of a well of the wheel cover.

The anti-theft retainer system 50 includes at least one and preferably a pair of expansion slots 58 arranged in diametrically opposed relation to one another between and preferably 90° offset from the opposing locking arms 52. The slots 58 extend radially across the bottom wall 40 of the wells 34 and from there axially outwardly along the side walls 36, 46 to render the axially inward end of the wells, and hence the opposing locking arms 52, expandable radially outwardly from an unstressed locked condition, illustrated in FIG. 6, to a outwardly flexed unlocked condition illustrated in FIG. 5. As shown in FIGS. 3 and 4, the slots 58 have a tool-insertion region or access opening with beveled or chamfered surfaces 60, 60a terminating at opposed reaction surfaces 62 of the retaining system 50, best shown in FIG. 3.

Figure 2:
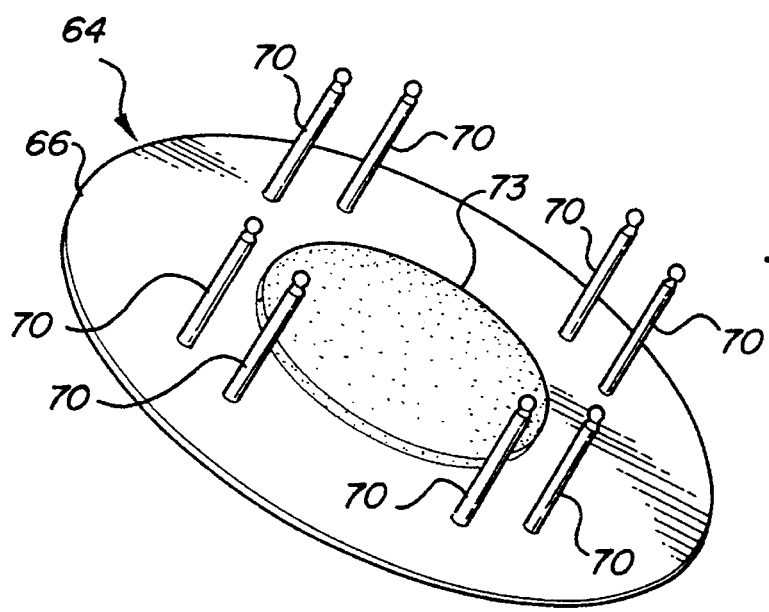
FIG. 2 is a perspective bottom view of the wheel cover installation/removal tool of the present invention.

FIGS. 1 and 2 illustrate a special anti-theft release tool 64 that may used to mount and dismount the wheel cover 30 on the wheel 10. The tool 64 includes a rigid base 66 having a handle 68 secured to an outer side thereof for grasping by a user, and a plurality of rigid, force-applying rod-like members 70 corresponding in number and arrangement to that of the tool-insertion regions at surfaces 60 of the expansion slots 58 such that the free ends of the members 70 are able to register simultaneously with the tool-insertion regions 60 at surfaces of the expansion slots 58. The members 70 preferably are made of metal or rigid plastics material and are each formed with a spherical end portion 72 and an adjacent tapered portion 74 defining a reduced diameter annular recess or detent which is relatively larger in diameter than the spacing between the reaction surfaces 62 of slots 58 when in the unflexed condition, as shown in FIGS. 4 and 6. A pad 73 of soft material such as foamed plastic or other suitable resilient cushioning material is provided on the backside of the base 66 between the force-applying members 70 for engaging the wheel cover and protecting it from damage during installations and removal of the wheel cover with the tool.

The wheel cover assembly 30 is mounted on the vehicle wheel 10 by aligning the wells 34 with the lug nuts 26 and then forcing the cover steadily toward the wheel 10. The inner free end of the locking arms 52 are preferably tapered at 76 and when the locking arms 52 are piloted over the lug nuts 26, the tapered ends 76 confront the rib 28 of the lug nuts forcing the locking arms 52 to flex radially outwardly as the tapered ends 76 move past the ribs 28. The outward expansion of the locking arms 52 is accommodated by the widening of the expansion slots 58 against the constant inwardly biased force of the wells 34 and arms 52. Further extension of the arms 52 brings the ribs 28 of the lug nuts into seated engagement within the locking grooves 56 of the arms 52 as illustrated in FIG. 6, securely locking the wheel cover in position on the wheel.

The wheel cover 30 may be dismounted from the wheel 10 only by use of the special anti-theft release tool 64 and only when all of the locking arms 52 are released simultaneously from engagement with their respective lug nuts 26. The capture of the ribs 28 within the locking grooves 56 and the inwardly biased force exerted by the arms 52 prevents the arms 52 from being pulled axially outwardly free of the lug nuts 26. To dismount the wheel cover using the tool 64, the ends of the force-applying members 70 are inserted into the wells in the manner illustrated in FIGS. 1 and 4, and the spherical ends 72 are forced axially through the tool-insertion regions 60 of the slots 58 causing, as illustrated in FIG. 5, the spherical end 72 to engage the surfaces 60 expanding the slots 58 radially outwardly away from one another. As the spherical ends 72 pass through the slots 58, the slots 58 widen which causes the wells 54 and hence the locking arms 52 out of locking engagement with the ribs 28 of the lug nuts 26. The reaction surfaces 62 of the slots 58 bear against the tapered portions 74 of the members 70 to support and maintain the slots 58 in the outwardly expanded condition permitting the wheel cover 30 to be removed from the wheel 10.

TO reinstall the wheel cover 30, the cover 30 may be positioned on the wheel 10 and the members 70 of the tool 64 withdrawn from the slots 58, as illustrated in FIG. 6, causing the wells 34 and hence their locking arms 52 to self-bias radially inwardly to close around and embrace the ribs 28 of the lug nuts 26 to again secure the wheel cover in place on the wheel 10. To facilitate easy removal of the force-applying members 70, the axially inner side is beveled at surfaces 60a.

Figure 9:
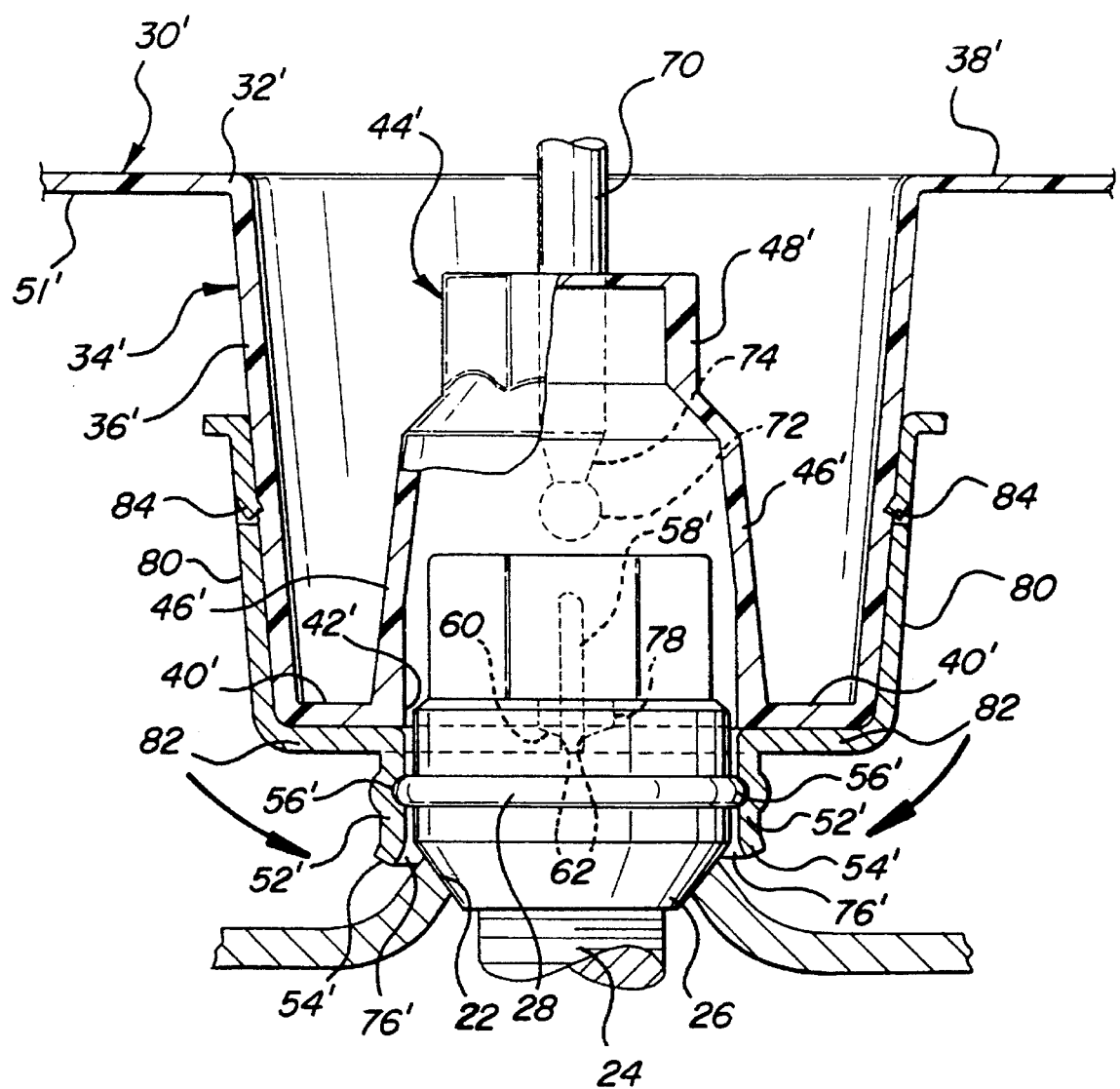

Referring to FIGS. 7–9, a second embodiment of the invention is illustrated, wherein like features are referenced by like but primed reference numerals. The wheel cover assembly 30 of the second embodiment includes similar wells 34' but the bottom walls 40' thereof are formed with access openings 78 of sufficient diameter to accommodate the passage of the spherical ends 72 of the force-applying members 70 of the tool 64.

The anti-lock retainer system 50' of the second embodiment differs in that it is formed separately from the wells 34'. The system 50' includes at least one and preferably a plurality of cup-shaped members or retainers formed of a resilient metal such as stainless steel or a spring steel (e.g., grade 1050 or the like) associated with the wells 34'. Each retainer 50' includes an upstanding tubular portion 80 and an annular radially inwardly projecting bottom wall portion 82 that is secured in nested engagement about the side wall 36' and bottom wall 40' of the wells 34'. One way of securing the retainers 50' to the wells 34' is to provide directional mounting tabs 84 on the tubular mounting portions 80 extending radially inwardly toward the side walls 36' of the wells 34'. Other suitable fastening arrangements such as bands, screws, rivets or other equivalent devices can be used.

The retainers 50' can be mounted on the wells 34' by sliding the tubular portions 80 over the ends of the wells and forcing them axially along the side walls 36' until the bottom walls 82 of the retainers 50' bottom out against the bottom walls 40' of the wells 34'. As the retainers 50' are slid along the wells 34', the tabs 84 are flexed initially outwardly and return inwardly to grip the side walls 36' of the wells 34' to prevent removal of the retainers 50'.

The retainers 50' have similar locking arms 52' that are formed as a unitary portion of the retainers 50'. As illustrated FIGS. 8 and 9, two such locking arms 52' are preferred for each retainer 50' and are provided with tapered ends 76' and locking grooves 56' for engaging the ribs 28 of the lug nuts 26. The retainers 50' each include at least one and preferably a pair of opposing expansion slots 58' arranged between the locking arms 52' and preferably offset 90° from the arms 52'. The slots 58' extend radially across the bottom wall 82 of the retainers 50' and then axially along the tubular portion 80 thereof. The expansion slots 58' enable the retainers 50', where mounted on the wells 34', to flex radially outwardly from an initial unstressed locking condition illustrated in FIG. 9 to an outwardly flexed and unlocked condition illustrated in FIG. 8. The expansion slots 58' are provided with similar enlarged tool-insertion regions 60' aligned with the access openings 78 and having chamfered edges and opposed reaction surfaces 62 to accommodate the insertion and removal of the force-applying members 70.

The retainer system 50' operates much the same way as the system 50 described above. Tapered ends 76' of the locking arms 52' permit the cover member 32 to be pressed into engagement on the wheel. To remove the cover member 32', the spherical ends 72 of the force-applying members 70 are extended through the access openings 78 and into the expansion slots 58' of the retainers 50', flexing the inward end of the retainers 50' and thus the locking arms 52' radially outwardly away from the wells 34' to mount or dismount the cove assembly 30' from the wheel 10 in the same manner described above for the first embodiment of the invention.

The disclosed embodiments are representative of the preferred forms of the invention, but are intended to be illustrative rather than definitive thereof. The invention is defined in the claims.

I claim:

1. A center mount wheel cover assembly for covering the wheel of an automotive vehicle, said assembly comprising:

a cover member having axially inner and outer sides and a plurality of circumferentially spaced wells extending axially inwardly from said outer side of said cover member each having a central opening to receive an associated lug nut of the wheel; and an anti-theft retainer system provided on said inner side of said cover member having resilient lug nut-embracing locking arms extending axially from at least one of said wells and arm-expanding reaction surfaces provided between said locking arms and accessible through said cover member, said locking arms being expandable radially outwardly to receive an associated one of the lug nuts between said locking arms and biased radially inwardly to close at least partially around and embrace the lug nut to lock said cover member on the wheel, said locking arms being releasable from locked engagement with the lug nut by insertion of a force-applying anti-theft release tool between said reaction surfaces causing said reaction surfaces to deflect outwardly of one another thereby expanding said locking arms radially outwardly to permit the removal of said cover member from the wheel.

2. The assembly of claim 1 wherein said cover member includes a unitary cap member covering each of said central openings.

3. The assembly of claim 1 wherein said locking arms are formed as unitary structure of said cover member.

4. The assembly of claim 3 wherein said well includes at least one expansion slot arranged between said locking arms having opposing edges defining said reaction surfaces.

5. The assembly of claim 4 wherein said slot includes an enlarged tool-insertion region formed in a bottom wall of said well having an axially outwardly facing chamfered surfaces.

6. The assembly of claim 5 including a pair of said locking arms arranged in diametrically opposed relation to one another and a corresponding pair of said slots arranged also in diametrically opposed relation between said arms.

7. The assembly of claim 6 wherein said well includes radially spaced side walls projecting axially outwardly from said bottom wall of said well, said slots extending across said bottom wall and axially outwardly along each of said side walls to render said well flexible.

8. The assembly of claim 3 wherein a plurality of said wells are provided with said locking arms.

9. The assembly of claim 8 wherein said force-applying anti-theft release tool comprises a base and a plurality of circumferentially spaced rod members projecting from said base corresponding in number and arrangement to said plurality of wells having said locking arms, said rod members having free ends thereof extendible together between said arm expanding reaction surfaces of each of said wells to simultaneously expand and unlock each of said locking arms to permit removal of said cover member from the wheel, said locking arms of said wells working in cooperation to resist unauthorized removal of said cover member until such time as all of said locking arms are unlocked simultaneously by said force applying anti-theft release tool.

10. The assembly of claim 3, said lug nut includes a locking rib; said locking arms include a locking shoulder adjacent a free end of said arms engageable with said locking rib.

11. The assembly of claim 3 wherein said cover member and said retainer system are fabricated of plastics material.

12. The assembly of claim 1 wherein said cover member is fabricated of plastics material and said anti-theft retainer system comprises at least one metal cup-shaped member having an upstanding tubular portion secured in position about a side wall of said well and from which said locking arms project and an annular bottom wall portion extending radially inwardly of said tubular portion in overlying relation to said bottom wall of said well, said cup-shaped member including at least one expansion slot extending radially across said bottom wall portion and axially along said sleeve portion having walls thereof defining said reaction surfaces, said bottom wall of said well including at least one associated access opening aligned with said slot to accommodate the insertion of said force-applying anti-theft release tool into said slot through said cover member causing said cup-shaped member and said locking arms to expand radially outwardly of said well.

13. The assembly of claim 12 wherein said cup-shaped member includes a plurality of circumferentially spaced slots arranged between said locking arms and said well includes a plurality of said access openings aligned with said slots.

14. The assembly of claim 13 wherein said slots each include an enlarged tool-insertion region having chamfered edges to guide said force-applying anti-theft tool.

15. The assembly of claim 12 wherein a plurality of said wells is provided with said cup-shaped members.

16. The assembly of claim 15 wherein said force-applying anti-theft release tool comprises a base and a plurality of circumferentially spaced rod members projecting from said base corresponding in number and arrangement to said plurality of wells having said cup-shaped members, said rod members having free ends thereof extendible together between said reaction surfaces of each of said cup-shaped members to expand and unlock said locking arms of said cup-shaped members simultaneously to permit removal of said cover member from the wheel, said locking arms of said cup-shaped members working in cooperation to resist unauthorized removal of said cover member until such time as all of said locking arms are unlocked simultaneously.

* * * * *